July 2, 1935. J. R. HAINES 2,007,085
SWITCH MECHANISM FOR AUTOMOBILE DIRECTION SIGNALS
Filed Sept. 9, 1932 3 Sheets-Sheet 1
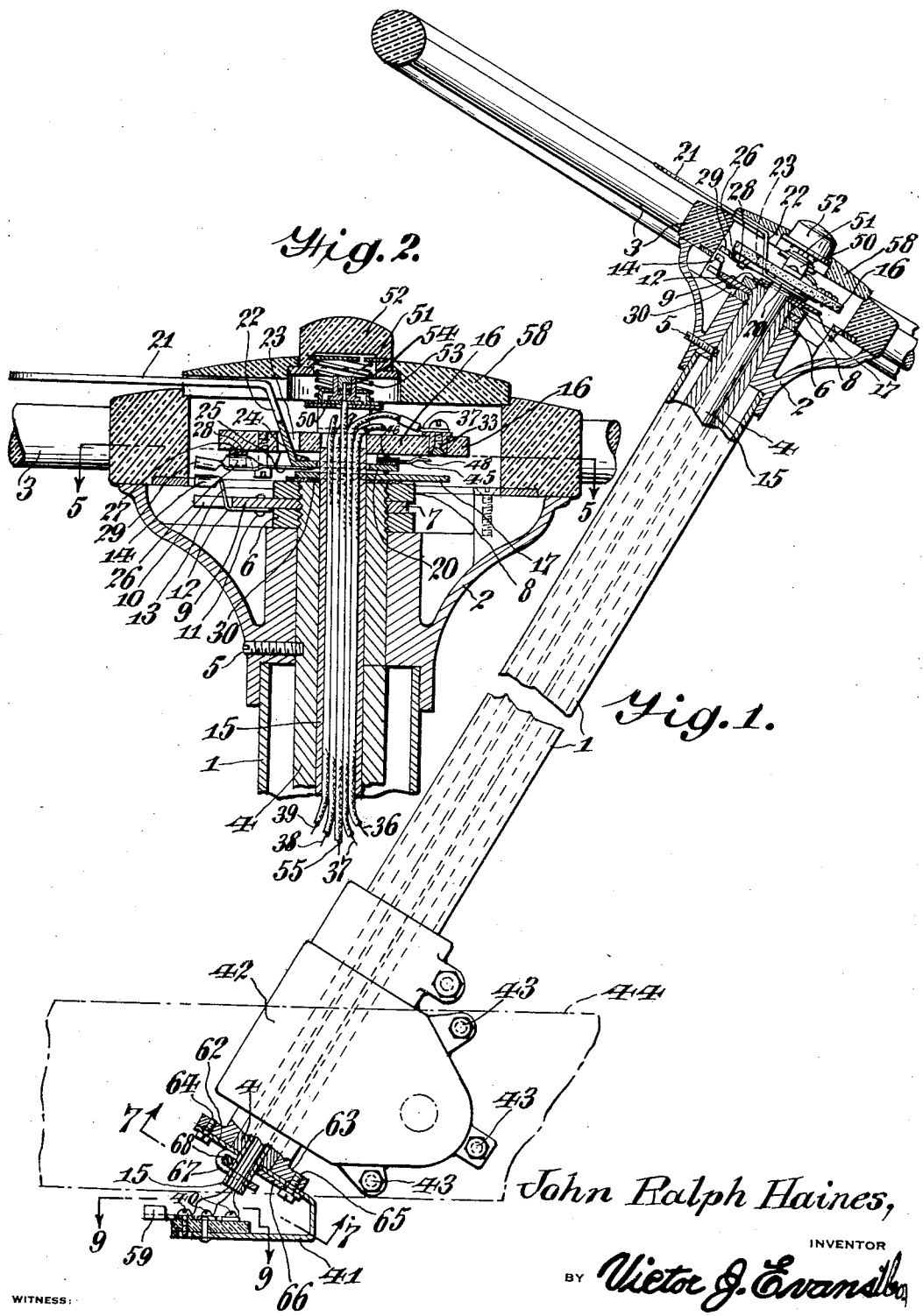
John Ralph Haines, INVENTOR
BY Victor J. Evans
ATTORNEY

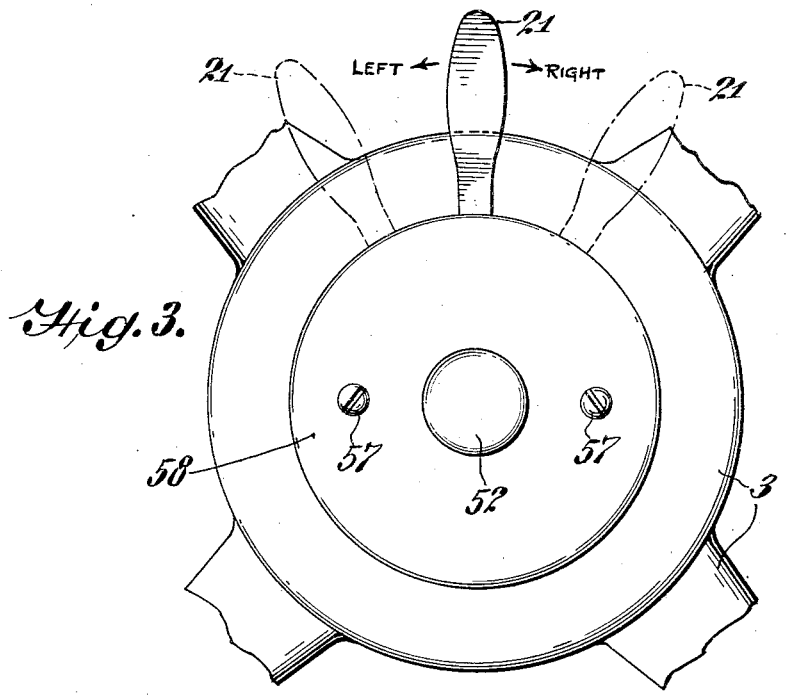
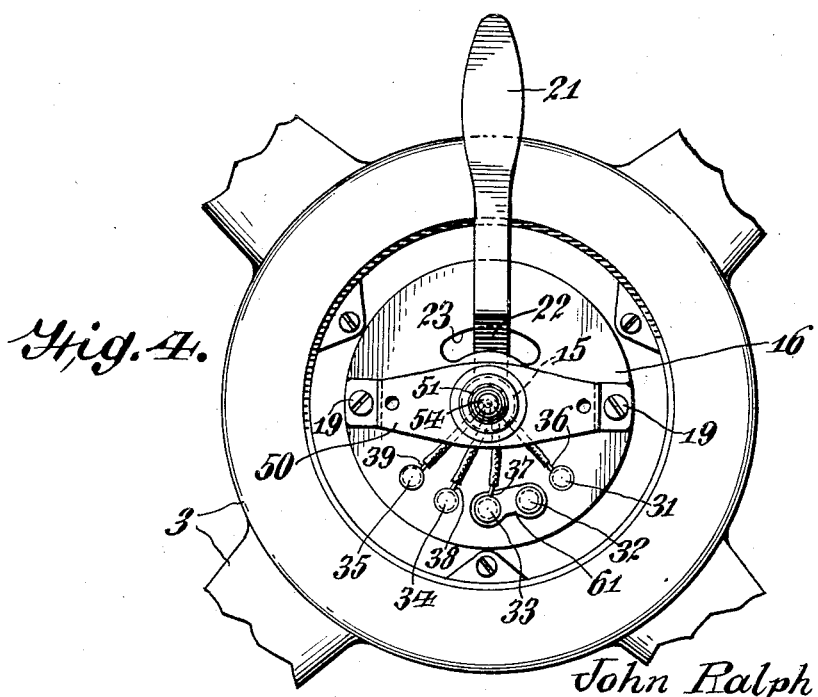

July 2, 1935.  J. R. HAINES  2,007,085
SWITCH MECHANISM FOR AUTOMOBILE DIRECTION SIGNALS
Filed Sept. 9, 1932   3 Sheets-Sheet 3
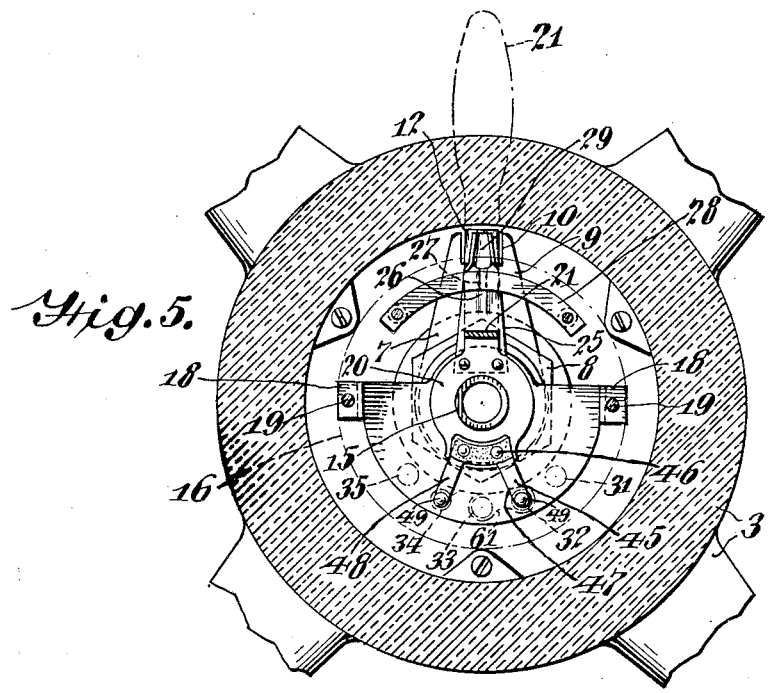
John Ralph Haines, INVENTOR
BY Victor J. Evans
ATTORNEY Patented July 2, 1935

2,007,085

UNITED STATES PATENT OFFICE 2,007,085

SWITCH MECHANISM FOR AUTOMOBILE DIRECTION SIGNALS

John Ralph Haines, Vincentown, N. J.

Application September 9, 1932, Serial No. 632,439

3 Claims. (Cl. 200—59)

The present invention relates to an improved switch mechanism for use in connection with a direction signal for automobiles and an object is to provide an improved construction of the kind described, claimed and illustrated in a copending application filed the 25th day of March 1932, Serial Number 601,279.

Another purpose of the present invention is to provide a switch mechanism wherein the various switch elements including a push button for the horn or audible signal mounted in the hub of the steering wheel, so that the various leads or wires (not shown) from the switch elements and the button may pass through the steering column, as in the copending above identified application and connect with a segment at the lower extremity of the column, in order that when it is desired to move the lever for closing an electric circuit for displaying a right or left turn, the lever is at all times accessible to the operator, due to it being immediately associated with the hub of the steering wheel, and when the steering wheel is rotated to return it to its initial position for driving straight ahead, the switch lever is returned to its initial position, thereby opening the circuit.

Another purpose is to provide, in a switch mechanism of this kind a centrally notched segment on an insulating disc mounted in the hub of the steering wheel in cooperation with a yieldable or spring arm movable with the switch lever and adapted to engage the notch in the segment for retaining the switch lever in its normal position, in which case the steering wheel is free to rotate to its maximum degree in either direction.

Still another purpose is to provide in a switch mechanism of this kind a spring or yieldable arm carried by an arm rigid with the steering rod of the steering wheel, and in the path of which the yieldable or spring arm of the switch lever may assume a position, so that when the steering wheel is returned to its initial position for driving straight ahead, the spring arm of the switch lever is returned to its initial position in engagement with the notch of the segment, and therefore opening the circuit and extinguishing the signal given.

It is well known that switch mechanisms have been mounted on the hub of steering wheels, that is to say broadly, but in this application it is not the aim to define the present invention broadly, but to define the same to emphasize the idea of rendering the switch mechanism conveniently accessible, therefore on the hub of a steering wheel, so that subsequently to having moved the switch lever to close an electric circuit (not shown) but illustrated in the copending application above identified, the steering wheel, through the medium of an element movable therewith, may restore the switch lever to its initial position, and hence open the circuit, and therefore extinguishing the signal.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view with the steering column in section, and the segment at its lower end likewise in section, and the hub of the steering wheel in section, displaying parts of the switch mechanism in elevation.

Figure 2 is an enlarged vertical sectional view through the hub of the steering wheel, with the switch mechanism therein in section.

Figure 3 is a plan view of the hub of the steering wheel.

Figure 4 is a plan view of the hub of the steering wheel showing the cover plate for the switch mechanism removed, displaying the terminals for the contacts on an insulating disc.

Figure 5 is a sectional view on line 5—5 of Figure 2.

Figure 6 is a sectional view through the hub of the steering wheel, illustrating the switch mechanism in elevation at right angles to that shown in Figures 1 and 2.

Figure 7 is a detail view in elevation of the lower end of the steering column, taken on line 7—7 of Figure 1.

Figure 8 is a view in edge elevation of the structure shown in Figure 7.

Figure 9 is a plan view of the segment at the lower end of the steering column, taken on line 9—9 of Figure 1.

Referring to the drawings 1 identifies the outer tubular stationary shell of the steering column, slightly over the upper end of which the casing of the hub 2 of the steering wheel 3 rotatably fits, and rotatable in the stationary shell is a movable steering tubular rod 4, with which the casing 2 of the hub of the steering wheel is made fast by means of a set screw 5. The upper extremity of the movable steering rod 4 is exteriorly threaded for the reception of a nut 6 adjacent to which a collar 7 is clamped by means of a second lock nut 8. The fact is the collar 7 may or may not be threaded on the tubular rod 4, due to the fact that it is located or clamped between the two nuts 6 and 8.

The collar 7 has a projecting arm 9, which is bifurcated at 10, and riveted or otherwise secured at 11 to the arm of the plate 7 is a spring arm 12, the right angle end 13 of which engages through the bifurcation 10 of the arm 9. The terminal 14 of the right angle end 13 is V shaped in cross section and is adapted for the purpose of returning a switch lever to its initial position, that is to say when the steering wheel is restored to its initial position for driving straight ahead.

Passing through the movable steering rod 4 and being fixed at its lower end against movement as hereinafter set forth is a tubular member or rod 15, to the upper end of which an insulating disc 16 is fastened in position. In order to fasten this insulating disc to the rod or tubular member 15 a plate 17 is frictionally shrunk on the rod or tubular member 15, and is in turn, through the medium of the lugs 18 and screws 19, fastened to the disc 16. A ring or collar 20 is movably mounted on the upper end of the tubular rod or member 15, and is interposed between the disc 16 and the plate 17, and is provided with a switch lever 21. This switch lever is offset from the ring or collar 20, by means of a lateral portion 22, which operates through a slot 23 formed in the disc 16. Also riveted or otherwise secured at 24 to the ring or collar 20 is a spring arm 25, which has a V shaped portion 26 for engagement in a notch 27 of a segmental strip 28 which is secured to the disc 16 for the purpose of retaining the ring or collar 20 against movement. However, beyond the V shaped portion 26 of the spring arm 25, the extremity of the spring arm is V shaped at 29 reversely to the portion 26. Obviously when the switch lever 21 is moved laterally in either direction until the lateral portion 22 of the lever engages one or the other of the ends of the slot 23 (which is likewise segmental), the spring arm is depressed downwardly so as to disengage the V shaped portion 26 from the notch 27 allowing the V shaped portion 26 to ride upon the surface of the segment 28, and therefore positioning the V shaped portion 29 in the path of the V shaped portion 14 of the spring arm carried by the plate 7. Obviously when this operation if performed for the purpose of closing an electric circuit (not herein shown, but illustrated in said above identified copending application) resulting in the display of a signal for a right or left turn, the steering wheel then being restored to its initial position for driving straight ahead, the V shaped portion 14 of the spring arm 12 will return the ring 20 and its switch lever 21 to its initial position, hence opening the circuit. A ring of suitable insulation 30 is interposed between the plate 17 and the upper end of the movable steering or tubular rod 4.

The insulating disc 16 is provided with a plurality of terminal screws 31, 32, 33, 34 and 35 to which various leads or wires 36, 37, 38 and 39 are connected. These wires or leads pass downwardly through the fixed tubular rod 15 and are in turn connected to the binding screws 40 carried by a segment 41 fastened to one end of a casting or housing 42, in which the lower end of the stationary tubular shell 1 is made fast. This casting or housing is mounted in any suitable manner as identified at 43 to a portion of the frame or chassis 44 of the automobile, said frame or chassis 44 being shown in dot and dash lines in Figure 1.

Carried by the ring or collar 20 is a frog plate 45 shown as secured at 46 to the ring and insulated therefrom. This frog plate 45 has spring contact arms 47 and 48, which ride against the under surface of the disc 16, so that their depressed terminals 49 may engage with the ends of the terminal screws 31 to 35 inclusive. The spring arms 47 and 48 are spaced sufficiently to engage two of the terminal screws at a time, one of the spring arms 47 and 48 at all times being in circuit with a battery (not herein shown but illustrated in the copending application), in order to furnish current to close a circuit for displaying a right or left turn.

Also mounted upon the disc 16 is an arched plate 50, against which the conventional horn button mechanism 51 is supported, the button 52 proper being yieldably mounted through the medium of the spring 53. This horn button mechanism includes a terminal 54 to which a lead or wire 55 is connected, the lead or wire 55 being in turn connected to a binding screw 56 which is also carried by the segment plate 41 at the lower end of the column.

Secured by suitable screws 57 to the arched plate or cross piece 58 is an insulating cover plate 58, through which the horn button proper 52 passes.

Also secured to the segment plate 41 by the binding screws are terminal clips 59, to which leads or wires (not shown) may be connected, for in turn to be connected to right and left and stop visible signals (not shown) and battery (not shown), as identified in Figure 9 by the letters R, L, S and B. Carried by the binding screw 56 of the segment 41 is a clip 60 to which a wire or lead (not shown) may be connected, for in turn to be connected to an audible signal such as a horn.

As previously stated the wire or lead 37 is always in circuit with a battery (not shown), therefore to accomplish this result a connector plate 61 bridges from the terminal screws 32 and 33.

The segment plate 41 has a ring extension 62, which is secured to the flanged extension 63 of the casting or housing 42 by means of the screw bolts 64 and 65. Secured in position by the screw bolt 65 is one end 66 of a bifurcated clamp, the arms 67 of which straddle and engage about the lower end of the tubular rod 15, and through the medium of a transverse screw bolt 68 and nut 69, the bifurcated clamp retains the tubular rod 15 against rotation.

The invention having been set forth, what is claimed is:

1. A switch for direction indicators comprising in combination with a motor vehicle a steering mechanism including a steering shaft and a steering column therefor and a steering wheel on said shaft, a stationary tube fitted within said shaft and projecting above the upper end thereof, a plate fixed to a projecting end of the stationary tube, an insulating element fixedly supported on said plate and provided with a plurality of contacts, a switch lever having one end rockably mounted on the projecting end of the stationary tube and located between the plate and the element and provided with a frog insulated from the rockably mounted end of the lever, said frog having contact arms to ride over the plurality of contacts of the element for selectively closing several signal circuits, a yieldable element having a notch engaging portion movable with the mounted end of the lever, a segment fixed to one face of the insulating element and having a central notch receiving said notch engaging portion of the yieldable element for retaining the mounted end of said lever in its initial position, said yieldable element having an abutment engaging portion at its end, said switch lever extending laterally and radially and being adapted to rock the yieldable element in either direction, whereby the notch engaging portion of the yieldable element is moved out of engagement with the notch and caused to ride in either direction over said segment and retain the yieldable element depressed, a hollow body housing the foregoing elements and being rockable with the steering shaft, a projection carried by one of the elements of the steering mechanism and provided with an abutment adapted to assume a position in the path of the abutment engaging portion of the yieldable element when depressed, whereby upon restoring the housing and steering shaft to initial positions, the yieldable element returns to its initial position in engagement with said notch.

2. A switch for direction indicators comprising in combination with the steering mechanism of a motor vehicle, including a steering shaft and a steering wheel on said shaft, a stationary tube within said shaft but projecting beyond the upper end thereof, a support fixed to said projecting end, an insulating element mounted on said support and provided with a plurality of fixed contacts, a ring rockable about the projecting end between the support and the element and provided with a switch frog insulated from the ring, said switch frog having electrically connected contact arms to ride over and bridge certain of said fixed contacts for selectively closing several signal circuits, a segment having a centrally located notch fixed on said element diametrically opposite said fixed contacts, a member carried by the steering wheel, said member being provided with a projecting abutment, a yieldable element carried by said ring and extending radially and provided with a portion of corresponding contour to and engaging said centrally located notch to retain the ring in its initial position, said yieldable element having at its terminal an abutment engaging portion, and a switch lever carried by said ring for rocking the ring to the right or the left, thereby withdrawing the notch engaging portion from engagement with said notch and moving it over the segment depressing the abutment engaging portion into the path of said abutment, the rotation of the steering shaft in this direction moving said member correspondingly whereby the abutment will engage with the abutment engaging portion and thereby restore the notch engaging portion into engagement with the notch.

3. A switch for direction indicators comprising in combination with the hollow steering shaft of a motor vehicle, a stationary tube within the shaft and projecting beyond the upper end thereof, a plate fixed to said projecting end, an insulating element mounted on and fixed to said plate and spaced therefrom and provided with a plurality of fixed contacts, a ring rockable on the projecting end and between the plate and the element and provided with a switch frog insulated from the ring, said switch frog having a pair of contact arms to ride over from one to another of said fixed contacts for selectively closing several signal circuits, a segment having a centrally located notch fixed on the under face of said element diametrically opposite said fixed contacts, a collar fixed to the upper end of the steering shaft and provided with a radially projecting abutment, a yieldable element carried by said ring and extending radially and provided with a V shaped portion to engage said centrally located notch to retain the ring in its initial position, said yieldable element having at its terminal a second V shaped portion, and a switch lever carried by said ring for rocking the ring to the right or the left, thereby withdrawing the first V shaped portion out of engagement with said notch and riding it in either direction over the segment depressing the second terminal V shaped portion into the path of said abutment, the rotation of the steering shaft in either direction moving the collar correspondingly, whereby the abutment will engage with the second V shaped terminal portion and thereby restore the first V shaped portion in engagement with the notch, said segment having notches near its ends to be engaged by the yieldable element for retaining the adjusted position of the ring with the yieldable element in the path of said abutment.

JOHN RALPH HAINES.